US011877362B2

(12) United States Patent
Bandel et al.

(10) Patent No.: US 11,877,362 B2
(45) **Date of Patent: *Jan. 16, 2024**

(54) LIGHT EMITTING DIODE THERMAL FOLDBACK CONTROL DEVICE AND METHOD

(71) Applicant: HLI SOLUTIONS, INC., Greenville, SC (US)

(72) Inventors: Michael W. Bandel, North Aurora, IL (US); Ray M. Lazalier, Lake St. Louis, MO (US)

(73) Assignee: HLI SOLUTIONS, INC., Greenville, SC (US)

( * ) Notice: Subject to any disclaimer, the term of this patent is extended or adjusted under 35 U.S.C. 154(b) by 223 days.

This patent is subject to a terminal disclaimer.

(21) Appl. No.: 17/096,520

(22) Filed: Nov. 12, 2020

(65) Prior Publication Data

US 2021/0068218 A1 Mar. 4, 2021

Related U.S. Application Data

(63) Continuation of application No. 16/565,750, filed on Sep. 10, 2019, now Pat. No. 10,849,198, which is a continuation of application No. 15/961,050, filed on Apr. 24, 2018, now Pat. No. 10,412,804, which is a continuation of application No. 15/048,388, filed on Feb. 19, 2016, now Pat. No. 9,967,939.

(60) Provisional application No. 62/118,746, filed on Feb. 20, 2015.

(51) Int. Cl.
*H05B 45/10* (2020.01)
*H05B 45/18* (2020.01)

(52) U.S. Cl.
CPC .................................... *H05B 45/18* (2020.01)

(58) Field of Classification Search
CPC ........ H05B 45/10; H05B 45/18; H05B 47/10; H05B 47/105; H05B 47/20
See application file for complete search history.

(56) References Cited

U.S. PATENT DOCUMENTS 6,060,823 A 5/2000 Okamoto et al.
6,060,834 A 5/2000 Vilkinofsky
8,450,948 B2 5/2013 Huang
8,922,156 B2 12/2014 Shimura
(Continued)

FOREIGN PATENT DOCUMENTS

CN 2867784 Y 2/2007
CN 201294659 Y 8/2009
(Continued)

OTHER PUBLICATIONS

PCT /US2016/018688 International Search Report and Written Opinion dated May 17, 2016.
(Continued)

*Primary Examiner* — Jimmy T Vu
(74) *Attorney, Agent, or Firm* — Buckley, Maschoff & Talwalkar LLC

(57) ABSTRACT

A thermal foldback control system including a temperature sensitive circuit configured to output a reference voltage corresponding to a temperature of at least one selected from a group consisting of a light emitting diode (LED) driver, a LED engine, and a LED, wherein a driver output of the LED driver is based on the reference voltage.

16 Claims, 7 Drawing Sheets

(56) References Cited

U.S. PATENT DOCUMENTS

| | | | | |
|---|---|---|---|---|
| 9,416,925 | B2 | 8/2016 | Sarmadi | |
| 9,967,939 | B2 | 5/2018 | Bandel | |
| 10,412,804 | B2 | 9/2019 | Bandel | |
| 2008/0224634 | A1 | 9/2008 | Scilia | |
| 2011/0163696 | A1 | 7/2011 | Huang et al. | |
| 2012/0268040 | A1 | 10/2012 | Riesebosch | |
| 2012/0299481 | A1 | 11/2012 | Stevens | |
| 2013/0187619 | A1 * | 7/2013 | Dunipace .............. | H02M 3/156 323/225 |
| 2013/0271018 | A1 | 10/2013 | Luo | |
| 2014/0062327 | A1 * | 3/2014 | Battaglia ................ | H05B 47/10 315/210 |
| 2014/0139108 | A1 * | 5/2014 | Sarmadi ................ | F21V 7/0016 362/235 |
| 2014/0176111 | A1 * | 6/2014 | Kim ........................ | G05F 1/613 323/311 |
| 2014/0368130 | A1 | 12/2014 | Catalno et al. | |
| 2015/0108908 | A1 | 4/2015 | Denvir | |

FOREIGN PATENT DOCUMENTS

| | | |
|---|---|---|
| CN | 202773126 U | 3/2013 |
| CN | 104115085 A | 10/2014 |
| CN | 204168536 U | 2/2015 |
| EP | 2814302 | 12/2014 |

OTHER PUBLICATIONS

European Patent Application No. EP16753151 Supplementary European Search Report dated Oct. 2, 2018.

Chinese Patent Application No. 20160016377.3 First Office Action Issued by China National Intellectual Property Administration dated Jan. 11, 2019 with translation.

Chinese Patent Application No. CN201680016377.3, Second Office Action issued by the China National Intellectual Property Administration dated Sep. 4, 2019 with translation ( 17 pages).

Chinese Patent Application No. CN201680016377.3, Third Office Action issued by the China National Intellectual Property Administration dated Mar. 19, 2020 with translation (17 pages).

European Patent Application No. EP19206730 Extended European Search Report dated Jan. 31, 2020.

Chinese Patent Office Action for Application No. 202011223917.X dated Aug. 24, 2022 (10 pages, including an English statement of relevance).

* cited by examiner

LIGHT EMITTING DIODE THERMAL FOLDBACK CONTROL DEVICE AND METHOD

CROSS-REFERENCE TO RELATED CASES

This application claims the benefit to U.S. patent application Ser. No. 16/565,750, filed Sep. 10, 2019, which claims priority to U.S. patent application Ser. No. 15/961,050, filed Apr. 24, 2018, which claims priority to U.S. patent application Ser. No. 15/048,388, filed on Feb. 19, 2016, which claims priority to U.S. Provisional Patent Application No. 62/118,746, filed on Feb. 20, 2015, the entire contents of which are incorporated herein by reference.

FIELD

The present application relates to control devices and methods for light fixtures, for example light emitting diode (LED) light fixtures.

LEDs are increasingly being adopted in a wide variety of lighting applications, for example, automobile head and tail lights, street lighting, architecture lighting, backlights for liquid crystal display devices, and flashlights, to name a few. LEDs have significant advantages over conventional lighting sources such as incandescent lamps and fluorescent lamps. Such advantages include high power efficiency, good directionality, color stability, high reliability, long life time, small size and environmental safety.

SUMMARY

Some challenges related to thermal management and associated with most LEDs and their applications are identified and discussed. Some of these thermal challenges can be mitigated or resolved by using a thermal foldback control circuit that provides control signals to a dimmer control embedded in an LED driver. Next, the components, structure, functions, and implementations of various configurations of thermal foldback control circuits are described.

Although LEDs represent a relatively new market for illumination applications, LEDs as an alternative to conventional lighting products also brings with it certain demanding thermal challenges. That is, the efficiency of LEDs strongly depends on the junction temperature of the device. For example, the lumens (or light intensity) generated by an LED generally decreases in a linear manner as the junction temperature increases. The lifetime for the LED also decreases as the junction temperature increases.

Some lighting system manufacturers address these thermal challenges by designing systems with appropriate heat sinks, high thermal conductivity enclosures, and other thermal design techniques. These thermal design techniques, however, do not consider the LED driver integrated circuit (IC) as a control component in the thermal management system.

The LED driver can be used as a control component to modify the drive current of the LED based on temperature. As a result, the use of an LED driver with intelligent over-temperature protection provides an additional control mechanism that can increase the lifetime of LED light sources significantly, ensuring the rated lifetime and reducing the incidence of defective products.

Depending on the lighting manufacturer and application, the useful lifetime for LED lighting products ranges from approximately 20,000 hours to more than 50,000 hours, compared to less than 2,000 hours for incandescent bulbs.

However, as the junction temperature increases not only does the light output of an LED decrease, but the lifetime of the LED decreases as well. Intelligent thermal protection can also help reduce system cost by enabling system integrators to design the heat sink with lower safety margin.

Typically, the design of a thermal management system for an LED lighting device is focused on the heat sink and printed circuit board (PCB) design, while the opportunities for thermal management by the LED driver IC and driving circuit are not considered. Intelligent over-temperature protection by the LED driver IC can increase the lifetime of LED light sources significantly.

Temperature protection with LED driver ICs has been implemented in a variety of ways. Some LED driver devices include a sense pin to which an external temperature sensor may be attached. Different temperature sensing devices, including diodes, on-chip sensors, positive temperature coefficient (PTC) or negative temperature coefficient (NTC) thermistors can be used in LED lighting applications to assist in protecting the LEDs from overheating. After the temperature is accurately sensed, the response to any over-temperature condition is then implemented. One response is to quickly turn-off the drive current to the LEDs when a threshold temperature is exceeded. Lighting devices that include this type of response then "restart" the light source when the temperature is reduced, or alternatively, wait until a power cycle occurs, which typically restarts the lamp. There are some disadvantages related to this method, however.

For example, the abrupt shut-down method often requires the threshold temperature to be set high, to avoid incorrectly triggering a shutdown of the lamp. While this high threshold may protect the lamp from a catastrophic failure it still can lead to significant reduction in the lifetime of the LEDs. Also, turning off the LED current means that the light is switched off abruptly. This can cause a serious situation like panic in public areas. Many known LED drivers automatically restart when the system has cooled, and once restarted the system heats up and shuts-down repeatedly, resulting in a disturbing "flicker" effect.

Embodiments of the application help solve the above-mentioned issue by, in one embodiment, providing a thermal foldback control system electrically connected to a light emitting diode (LED) driver, the thermal foldback control system including a temperature sensitive circuit and a regulator. The temperature sensitive circuit is configured to output a reference voltage based on a first resistance and a second resistance. The regulator is configured to control a driver output of the LED driver based on the reference voltage.

In another embodiment, the application provides a method of controlling power to one or more light emitting diodes (LEDs). The method includes outputting, via a temperature-sensitive circuit, a control signal based on a first and second resistance. The method further includes controlling one or more LEDs based on the control signal. Wherein the first and second resistances vary in response to the temperature.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

It should be noted that the phrase "series-type configuration" as used herein refers to a circuit arrangement where the described elements are arranged, in general, in a sequential fashion such that the output of one element is coupled to the input of another, but the same current may not necessarily pass through each element. For example, in a "series-type configuration," it is possible for additional circuit elements to be connected in parallel with one or more of the elements in the "series-type configuration." Furthermore, additional circuit elements can be connected at nodes in the series-type configuration such that branches in the circuit are present. Therefore, elements in a series-type configuration do not necessarily form a true "series circuit."

Additionally, the phrase "parallel-type configuration" as used herein refers to a circuit arrangement where the described elements are arranged, in general, in a manner such that one element is connected to another element, such that the circuit forms a parallel branch of the circuit arrangement. In such a configuration, the individual elements of the circuit may not necessarily have the same potential difference across them individually. For example, in a parallel-type configuration of the circuit it is possible for two circuit elements that are in parallel with one another to be connected in series with one or more additional elements of the circuit. Therefore, a circuit in a "parallel-type configuration" can include elements that do not necessarily individually form a true parallel circuit.

Figure 1:
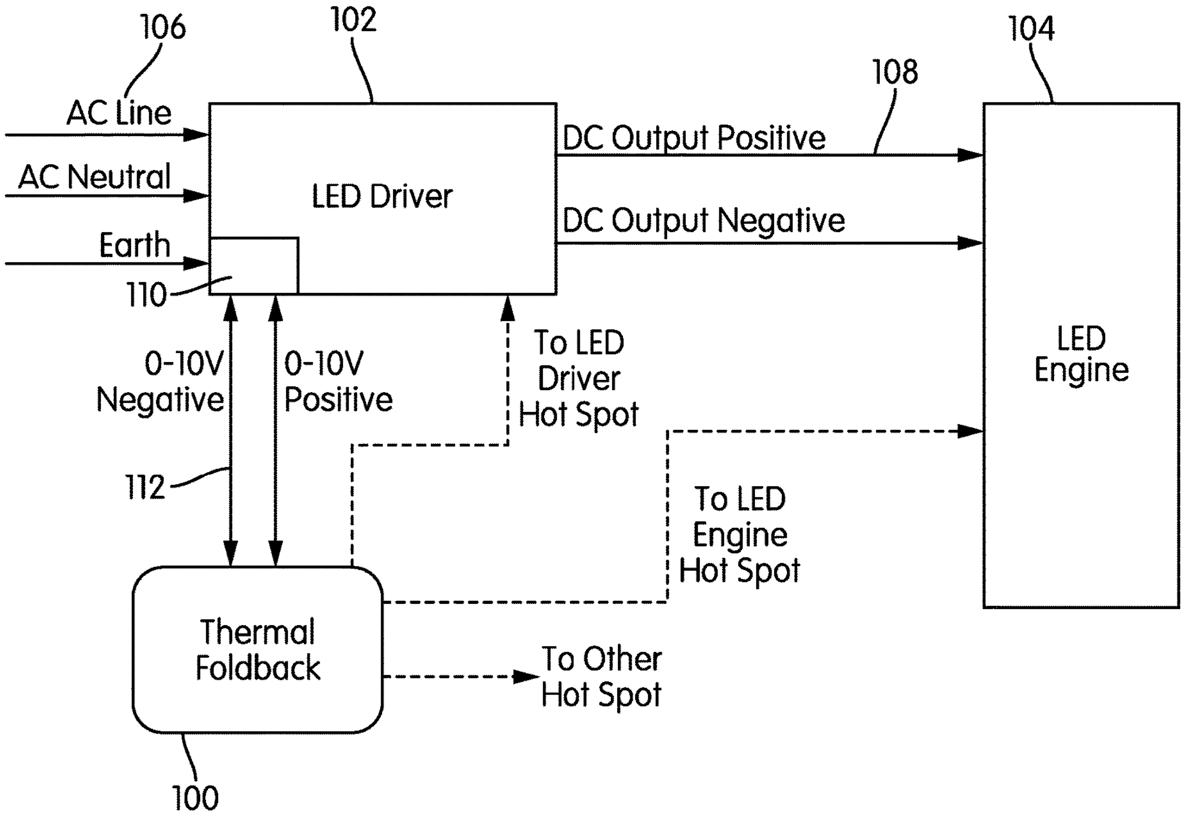
FIG. 1 is a light emitting diode (LED) system according to an embodiment of the application.

FIG. 1 depicts an embodiment of a system for controlling the temperature of a light source. According to this embodiment overheating of LED components is reduced and abrupt shut-downs of LEDs is eliminated. Thermal foldback device 100 is connected to a LED driver 102 that controls an LED engine 104 having one or more light sources, for example LED modules (not shown). The LED driver 102 has a power connection 106 and an output connection 108. In various embodiments, the power connection 106 includes an alternating current (AC) line, an AC neutral, and a ground terminal that can be coupled to an AC power source (e.g., commercial grid power). In another embodiment (not shown), the power connection includes positive and negative direct current (DC) terminals from a DC power source. The LED driver 102 also has an output connection 108 that includes a DC positive and negative connection to the LED engine 104. The LED driver generates the current and voltage (e.g., a driver output) to the LED engine 104 to power the LEDs. Although the primary discussion is directed to LEDs, the devices and methods described herein may be altered to be used with other light sources, such as florescent lights, as excess heat generated by light sources can degrade the electronic components associated with the generation of that light, as would be understood by one of ordinary skill in the art.

The LED driver 102 includes a dimmer interface 110 designed to connect to a standard dimmer switch (not shown) utilizing a positive and negative electrical connection 112. In one embodiment, the dimmer interface 110 drives a current and senses a voltage. The sensed voltage output of the dimmer interface 110 determines the current or the voltage generated by the LED driver to the LEDs. Typically, a dimmer switch includes some type of potentiometer to vary the resistance, which changes the voltage generated by the dimmer switch. In various embodiments, the dimmer interface 110 is a 0-10V dimmer interface, which senses a voltage between 0-10 volts (V). LED driver 102 has a 0-10V dimmer interface 110, such as a Dialog Semiconductor IW3630, which is commercially available and includes different components to perform various functions as would be understood by one of ordinary skill in the art.

The thermal foldback device 100 can use the dimmer interface 110 of the LED driver 102 for thermal management. The thermal foldback device 100 is connected to the LED driver 102 through the dimmer interface 110. The thermal foldback device 100 is designed to sense the temperature of a specific point based on the location of thermal foldback device 100, or specifically the thermistors (or resistors) of the thermal foldback device 100. If the sensed temperature exceeds a reference temperature, the thermal foldback device 100 automatically provides a signal to the LED driver 102 to dim the light source. The LED driver 102 dims the light modules by reducing the supplied current to the light source. The reduced light decreases the heat generated by the light sources thereby stopping any increase in temperature and acting to reduce the temperature. If the temperature continues to increase, the thermal foldback device 100 causes the LED driver 102 to dim the lights further and with appropriate driver may be configured to turn off the light sources completely. Once the temperature returns to a safe operating level, the thermal foldback device 100 signals the LED driver 102 to increase the current or voltage supplied to the light sources back to a normal illumination level. Through this process, the thermal foldback device 100 can be used to set an equilibrium level of LED illumination based on a predetermined maximum allowable temperature indicating overheating. By preventing overheating, the thermal foldback device 100 helps increase the life of the LED driver 102 and LED engine 104 and protect these and other components from premature failure.

In various embodiments, the thermal foldback device 100 is connected to or near a reference point to measure the temperature at a specific location. For example, the thermal foldback device 100 can be connected to the LED driver 102, the LED engine 104, LED, or other hot or temperature sensitive spots in the light fixture. The connection must be a thermal and mechanical connection. In various embodiments, the thermal foldback device 100 is connected to more than one reference point, or multiple thermal foldback devices 100 may be connected to different reference points. When multiple thermal foldback devices 100 are used, the thermal foldback devices 100 can be connected in parallel. The upper limit of the reference points monitored depends on the dimming driver source current rating, the size, and configuration of the associated light fixture as would be understood by one of ordinary skill in the art.

Figure 2:
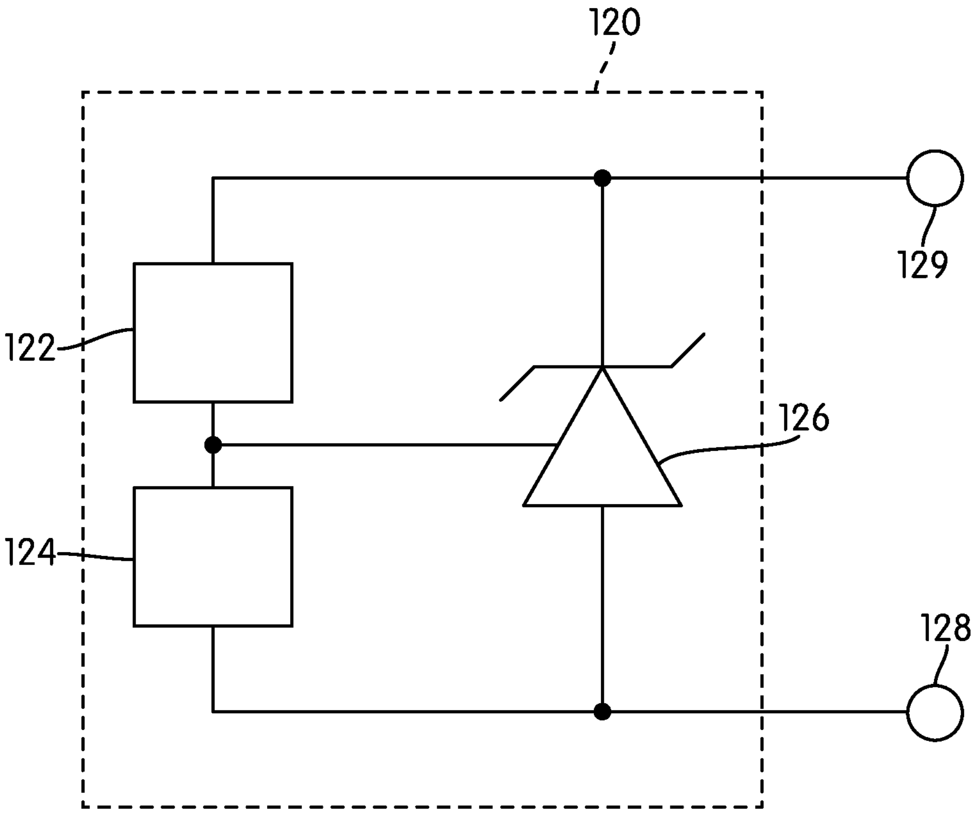
FIG. 2 is a thermal foldback control circuit of the LED system of FIG. 1 according to an embodiment of the application.

FIG. 2 depicts one embodiment of a thermal foldback device 100 implemented as control circuit 120. The control circuit 120 is a temperature-sensitive module for measuring temperature at a point of interest and providing a signal to an LED driver 102 via the dimming interface 110. According to one embodiment, the control circuit 120 includes a first resistor component 122 having a first resistance and a second resistor component 124 having a second resistance. In some embodiments, the first resistor component 122 and the second resistor component 124 are in a series-type configuration.

The first resistor component 122 may be a resistor or a thermistor, for example but not limited to, a negative temperature coefficient (NTC) type thermistor or a positive temperature coefficient (PTC) type thermistor. The second resistor component 124 may be a resistor or a thermistor, for example but not limited to, a negative temperature coefficient (NTC) type thermistor or a positive temperature coefficient (PTC) type thermistor. In one embodiment, at least one resistor component 122, 124 is a thermistor. If both resistor component 122, 124 are thermistors, the control circuit 120 of the thermal foldback device 100 may also provide dimming functions. In one embodiment, the control circuit utilizes a single thermistor, so that only one of the first and second resistor components 122, 124 is a thermistor and the other is a resistor.

The control circuit 120 also includes a shunt regulator 126. In some embodiments, the shunt regulator 126 is in a parallel-type configuration with the first and second resistor components 122, 124. In various embodiments, the shunt regulator 126 (or shunt voltage regulator) is a low-voltage adjustable precision shunt regulator (e.g., TLV431). In various embodiments, the shunt regulator 126 utilizes a Zener diode, an avalanche breakdown diode, or a voltage regulator tube. In some embodiments, the shunt regulator 126 is a three terminal device with an anode, cathode, and reference voltage terminal. The anode of the shunt regulator 126 is electrically connected to a first terminal of the second resistor component 124 and to a negative terminal 128 of the control circuit 120 (or dimming interface 110). The cathode of the shunt regulator 126 is electrically connected to a first terminal of the first resistor component 122 and to a positive terminal 129 of the control circuit 120 (or dimming interface 110). The reference input voltage terminal of the shunt regulator 126 is electrically connected between the first and second resistor components 122, 124 (i.e., a second terminal of the first resistor component 122 and a second terminal of the second resistor component 124). The shunt regulator 126 has a specified thermal stability over applicable industrial and commercial temperature ranges. In the embodiment, the control circuit 120 is powered from a current source. The current source can be provided from the current supplied to a light source or a secondary output current from the LED driver 102, such as the 0-10V dimmer interface 110.

The first resistor component 122 and second resistor component 124 provide a variable voltage divider for the reference voltage of the shunt regulator 126, so the reference voltage varies based on temperature. In a PTC embodiment, the first resistor component 122 is a resistor and the second resistor 124 component is a PTC thermistor. As the temperature increases, the PTC thermistor will increase its resistance at a faster rate than the resistor, which will increase the voltage to the reference input terminal causing the reference output voltage to fall and the current to sink. Because the PTC can be a device with linear change in resistance relative to temperature, the change in voltage is also substantially linear. As the reference input terminal increases, a threshold voltage, (the rated value of the reference device) is crossed and the shunt regulator 126 begins diverting (or sinking) a portion of drive current from the current source (e.g., from the dimming interface 110) away from the voltage divider, thus lowering the voltage across the positive terminal 129 and the negative terminal 128 of the control circuit 120. The lower voltage at the dimming interface lowers the current and voltage output of the LED driver 102 as dictated by the relationship between voltage and current through a diode, which dims the LED. The dimmed LED generates less heat and lowers the temperature sensed by the control circuit 120.

In a NTC embodiment, the first resistor component 122 is a NTC thermistor and the second resistor 124 component is a resistor. As the temperature increases, the NTC thermistor will decrease its resistance at a faster rate than the resistor, which will increase the input voltage to the reference terminal causing the reference output voltage to fall as it sinks current, similar to the PTC embodiment. Because the NTC can be a device with linear change in resistance relative to temperature, the change in voltage is also substantially linear. As the reference input terminal increases, a threshold voltage is crossed and the shunt regulator 126 begins diverting (or sinking) a portion of drive current from the current source (e.g., from the dimming interface 110) away from the voltage divider, which lowers the voltage across the positive terminal 129 and the negative terminal 128 of the control circuit 120. The lower voltage at the dimming interface lowers the current and voltage output of the LED driver 102 as dictated by the relationship between voltage and current through a diode, which dims the LED. Either the PTC or NTC embodiment lowers the reference output voltage, (sinks more current) as the temperature increases and increases the reference output voltage, (sinks less current) as the temperature decreases. When the sensed temperature causes the voltage divider to increases above the threshold voltage, (the rated value of the reference device), the current through the shunt regulator 126 is turned on.

Thus, the first and second resistor components 122, 124 and the shunt regulator 126 are configured so that as the sensed temperature increases, the resistance of the thermistor changes (e.g., increases with a PTC or decreases with a NTC), which changes the reference voltage input of the shunt regulator 126. When the reference input voltage reaches a certain threshold level, (the rated value of the reference device) the shunt regulator 126 sinks current and lowers the voltage across the positive terminal 129 and the negative terminal 128 of the control circuit 120. The lower voltage causes the LED driver 102 to reduce the light output of the LED engine 104. The threshold level is chosen close the minimum dimming voltage of a 0 to 10V system, typically about 1V to allow normal operation and provide dimming control when the heat is excessive. Additional components may be used in addition to or in place of those described to create a temperature sensitive circuit that provides a control signal to a driver to dim or otherwise reduce the light output of a light fixture as would be understood by one of ordinary skill in the art when viewing this disclosure. For example, a potentiometer may be provide to allow a user to adjust maximum light output of a light fixture or components to allow a user to adjust the maximum light output of the light fixture via the thermal foldback device 100.

Figure 3:
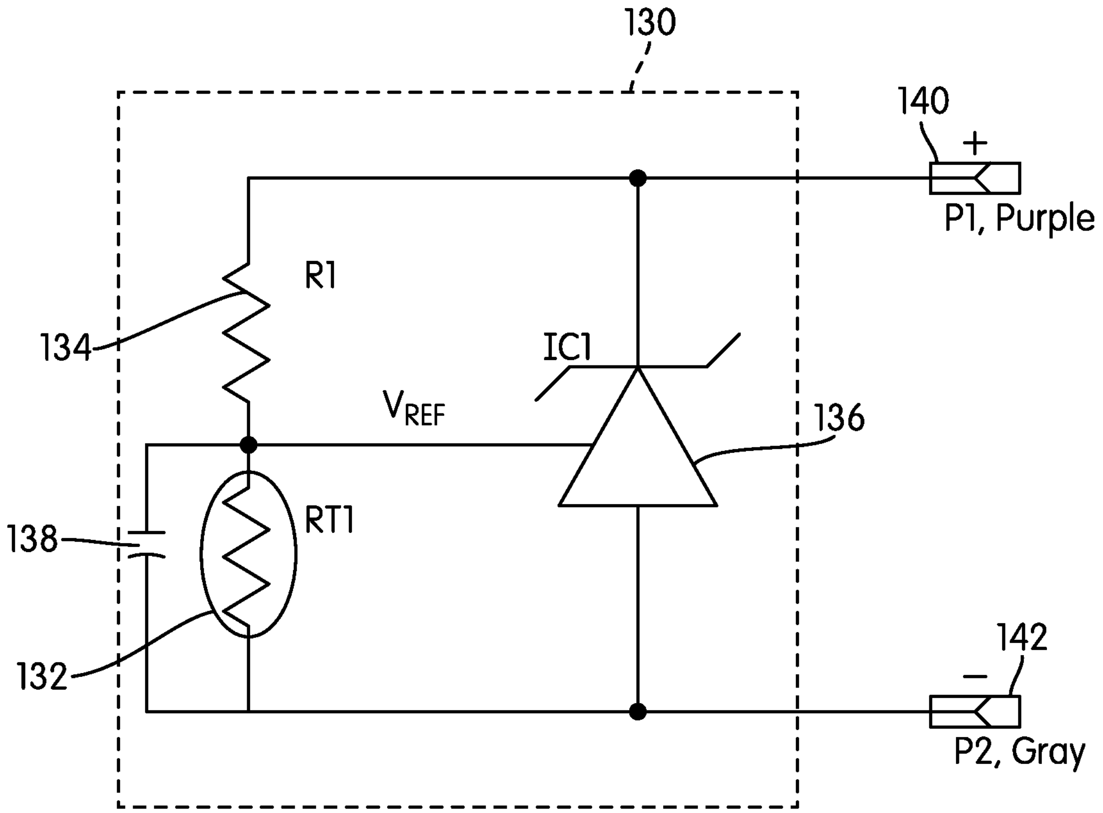
FIG. 3 is a thermal foldback control circuit of the LED system of FIG. 1 according to an embodiment of the application.

FIG. 3 illustrates another embodiment of a thermal foldback control circuit 130 for measuring temperature at a reference point and providing a control signal to an LED driver 102 (FIG. 1). The control circuit 130 includes a thermistor RT1 132 (e.g., PTC thermistor), a resistor R1 134, a shunt regulator IC1 136 (e.g., TLV431), and a capacitor C1 138 implemented with the thermistor 132. The reference terminal Vref of the shunt regulator 136 is electronically connected to a common node of the thermistor 132, the resistor 134 and the capacitor 138. The control circuit 130 is connected to an LED driver 102 through the positive terminal 140 (e.g., P1, Purple pins) and the negative terminals 142 (e.g., P2, Gray pins) of a dimmer interface 110. The thermistor 132, the resistor 134, shunt regulator 136, and capacitor 138 provide a PTC embodiment of the thermal foldback control circuit. The control circuit 130 can be powered from the voltage or current supplied from a secondary output voltage from the LED driver 102. Additional components may be used in addition to or in place of those described to create a temperature sensitive circuit that provides a control signal to a driver to dim or otherwise reduce the light output of a light fixture as would be understood by one of ordinary skill in the art when viewing this disclosure. The temperature threshold that allows current to flow through the shunt regulator and the amount of current flowing through the shunt regulator are set based on predetermined values of thermistor 132, resistor 134, and shunt regulator 136.

Figure 4A:
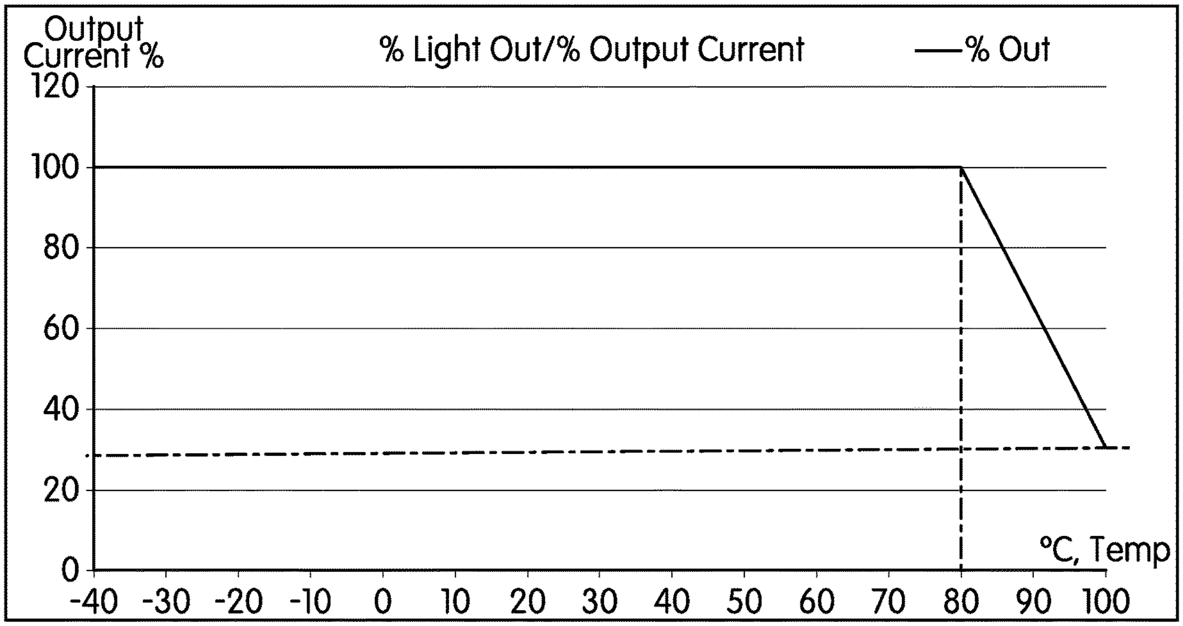
FIG. 4A is a graph illustrating a relationship between a sensed temperature and an output current percentage of an LED driver of the LED system of FIG. 1 according to an embodiment of the application.
Figure 4B:
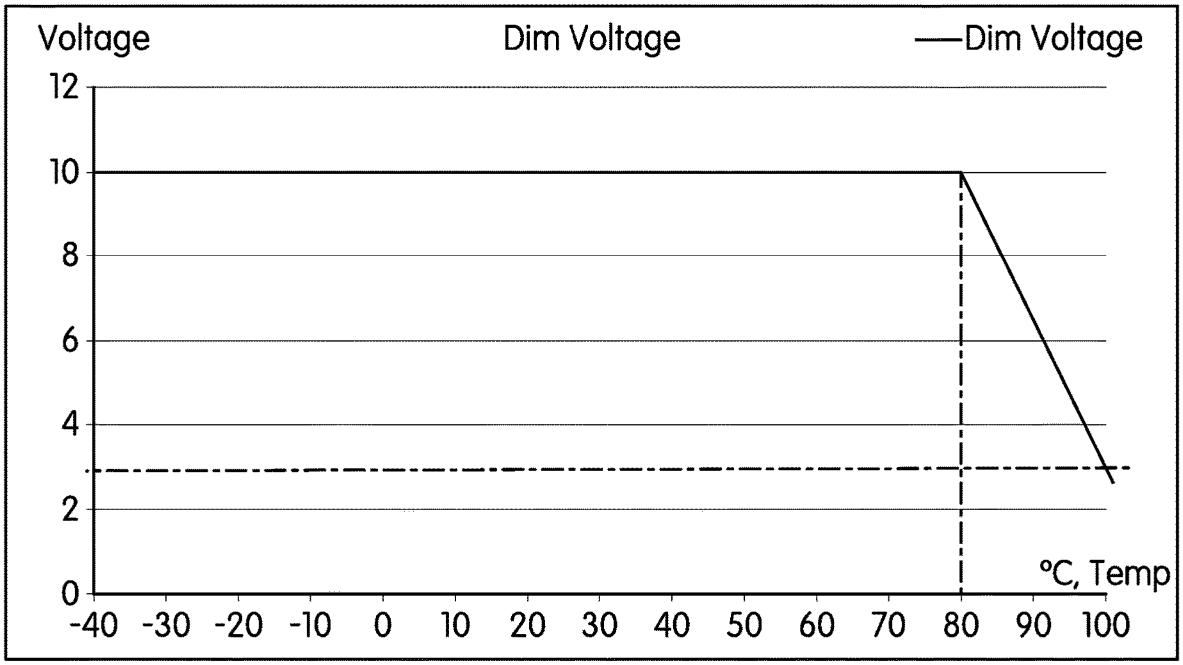
FIG. 4B is a graph illustrating a relationship between a sensed temperature and an output voltage of a thermal foldback control circuit of the LED system of FIG. 1 according to an embodiment of the application.
Figure 5:
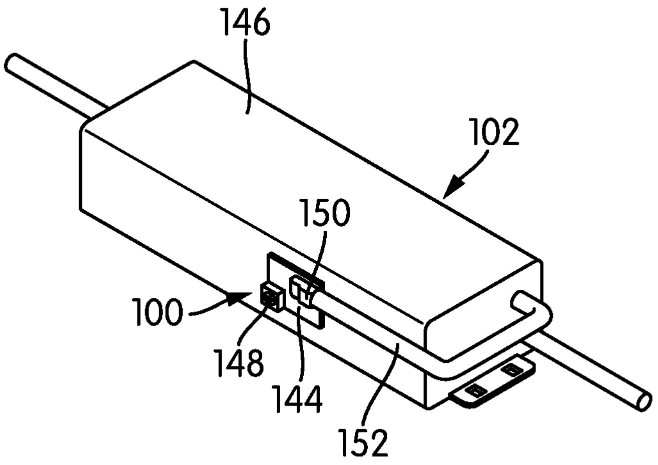
FIG. 5 is a perspective view of a thermal foldback device connected to an LED driver of the LED system of FIG. 1 according to an embodiment of the application.
Figure 6:
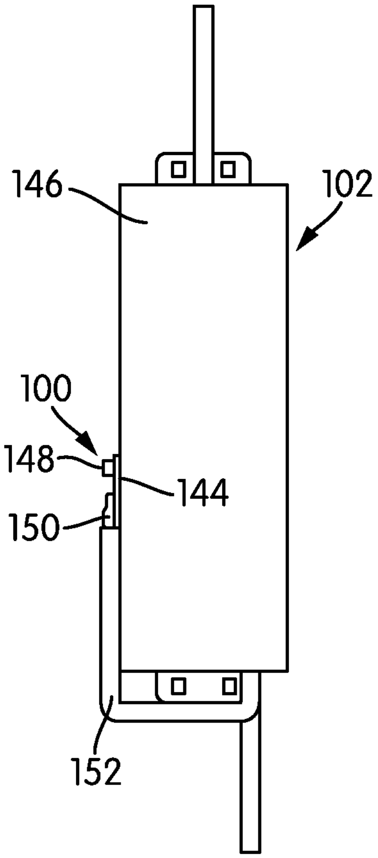
FIG. 6 is a top view of the thermal foldback device of FIG. 5 according to an embodiment of the application.
Figure 7:
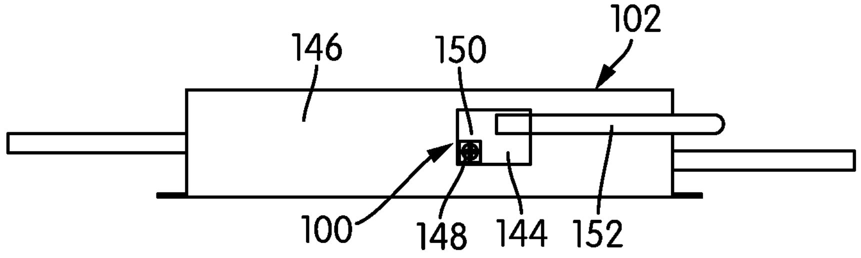
FIG. 7 is a side view of the thermal foldback device of FIG. 5 according to an embodiment of the application.
Figure 8:
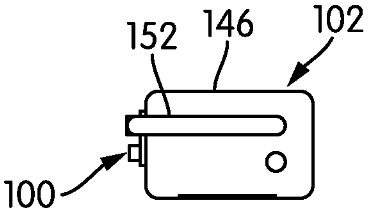
FIG. 8 is a side view of the thermal foldback device of FIG. 5 according to an embodiment of the application

FIG. 4A shows a relationship between sensed temperature and output current percentage of the LED driver 102 when the thermal foldback device 100 is coupled to dimming interface 110 of the LED driver 102. FIG. 4B shows a relationship between the temperature and the output voltage of the thermal foldback device 100 for the dimming interface 110. A temperature at a reference point that exceeds the temperature threshold value, for example but not limited to, approximately 80° C., activates the thermal foldback mechanism, which reduces the voltage across the dimming interface terminals. As a result, the LED driver 102 (FIG. 1) proportionately reduces the current supplied to the light source, for example LED modules. The current follows a linear line between 100% and a minimal dimmer level, for example 30% in the depicted embodiment. As the temperature decreases, the light may be increased along the same curve. If the temperature exceeds another temperature threshold value, for example approximately 100° C., the LED driver 102 may completely turn-off the light source to protect the light fixture. The LED driver 102 can include a setting that turns off power or removes current from the LED when the minimal dimmer level is reached, or the thermal foldback device 100 generates a minimum threshold voltage. The LED driver 102 turns back on when the temperature reduces to a safe level, such as a predetermined voltage level (e.g., approximately 80° C.).

According to one embodiment, thermal foldback device 100 (FIG. 1) is integrated on a single chip or printed circuit board (PCB) 144 as shown in FIGS. 5-8. The PCB 144 has a relatively small footprint, allowing the thermal foldback device 100 to be mounted externally to various reference points, for example, on the exterior of a an LED driver case 146. The PCB 144 may be mounted at a sensitive or hot spot location on the driver case 146. Hot spots can be determined through analytical computation or testing, such as thermal imaging. In the illustrated embodiment, the PCB is mounted to the case 146 using a screw 148, although other mechanical fastener or adhesive connections may be used. Thermal foldback device 100 is electrically connected to the driver 102 through one or more conductors. In the illustrated embodiment, the conductors are connected to the thermal foldback device through a connector 150 and extend through a conduit 152, although insulated wire conductors alone may be used.

In certain embodiments, the thermal foldback device 100 integrates more than one temperature sensitive unit mounted at different reference points. More than one thermal foldback device 100 may also be positioned at different reference points and connected to the driver 102. The upper limit of thermal foldback devices 100 and/or monitored reference points depends on the size and configuration of the associated light fixture as would be understood by one of ordinary skill in the art.

Figure 9:
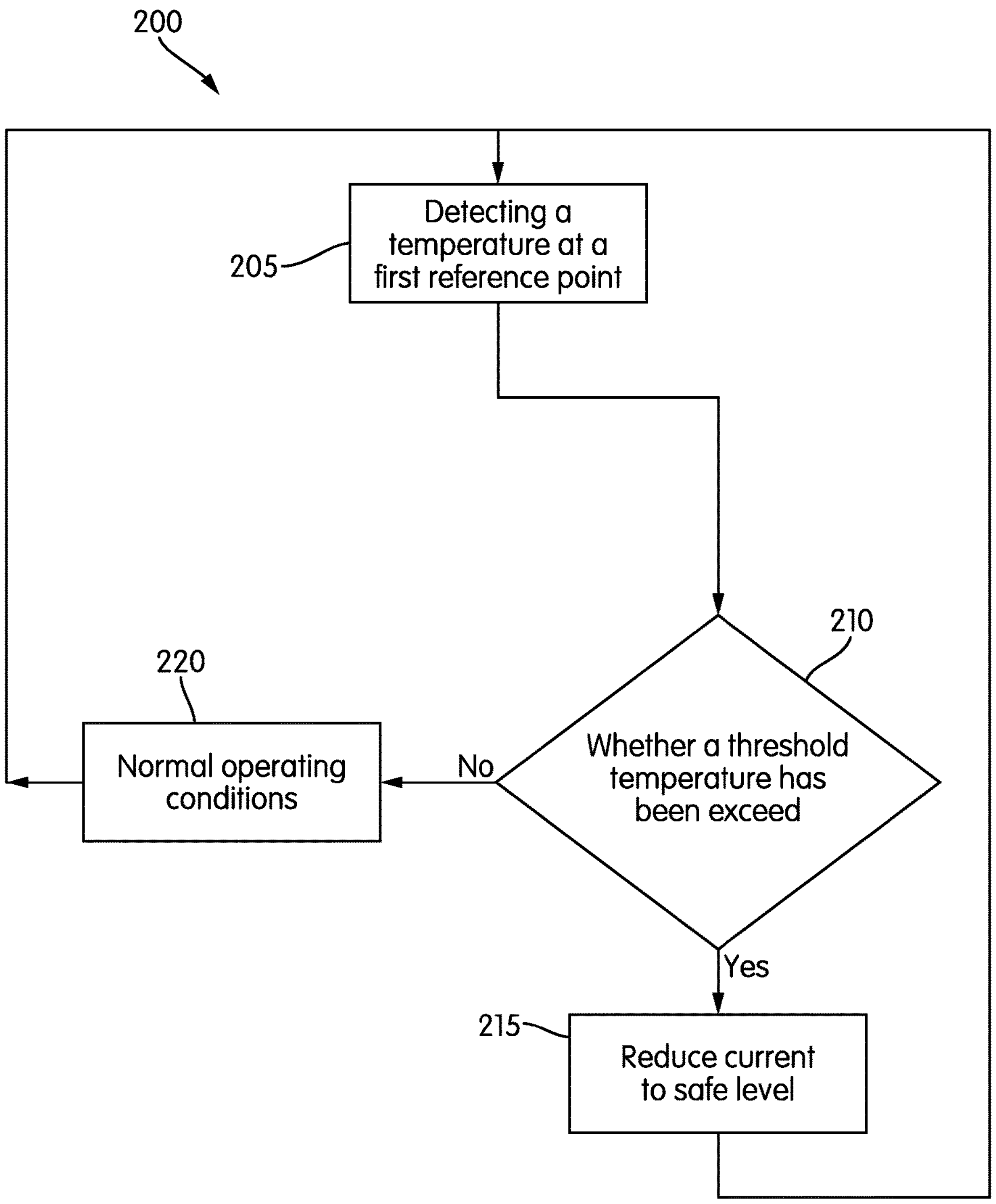
FIG. 9 is a flow chart illustrating an operation of a thermal foldback device of the LED system of FIG. 1 according to an embodiment of the application.

FIG. 9 illustrates one embodiment of a method 200 for monitoring and controlling the temperature of a light fixture operatively connected to the thermal foldback device 100. In operation, the thermal foldback device 100 detects a temperature at a reference point (Block 205). The thermal foldback device 100 determines whether the detected temperature has exceeded a temperature threshold (Block 210). If the detected temperature has exceeded the temperature threshold, the thermal foldback device 100 reduces the current (Block 215), the method 200 then proceeds back to Block 205. If the detected temperature has not exceeded the temperature threshold, normal operating conditions are continued (Block 220), the method 200 then proceeds back to Block 205.

Figure 10:
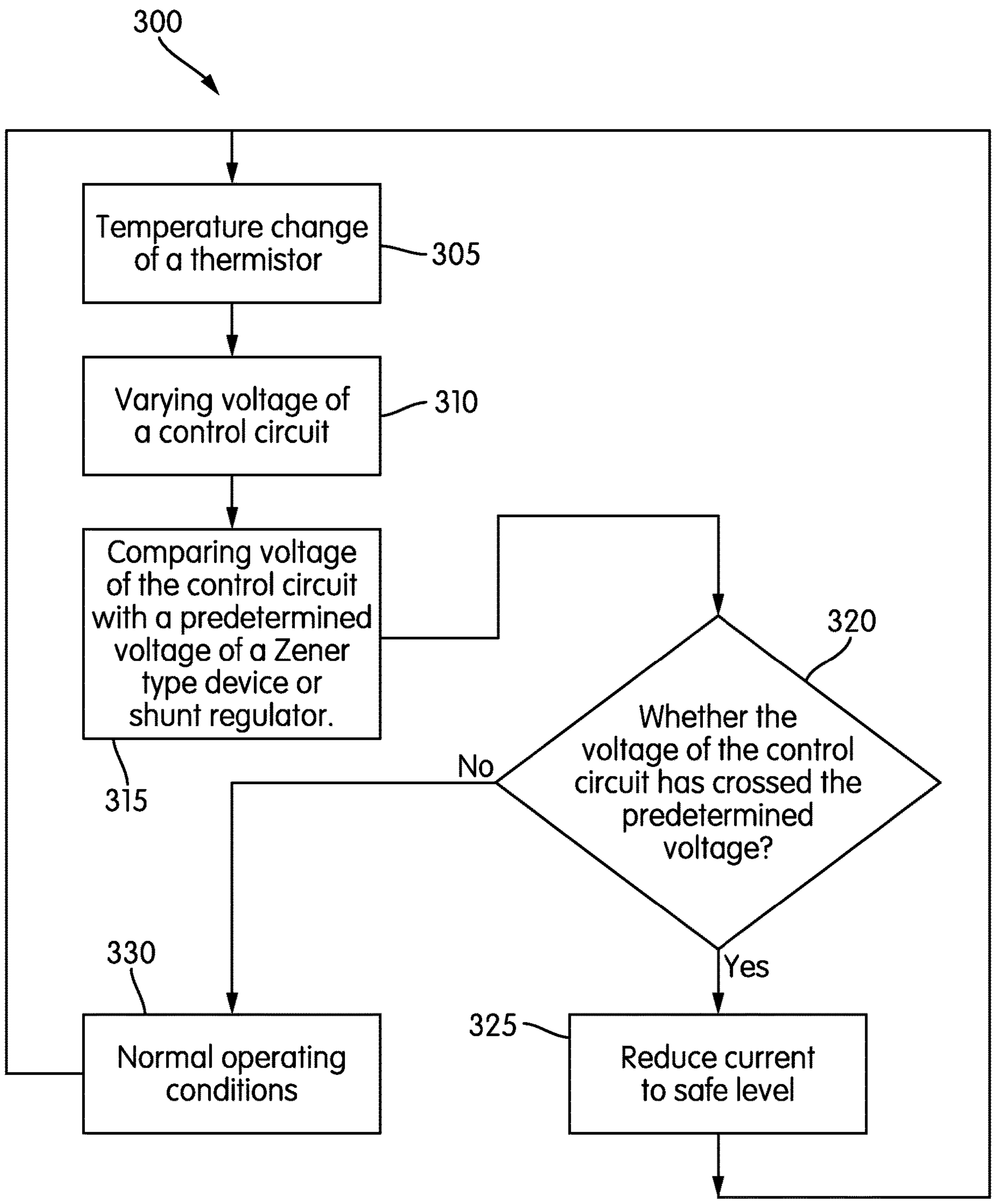
FIG. 10 is a flow chart illustrating an operation of a thermal foldback device of the LED system of FIG. 1 according to an embodiment of the application.

FIG. 10 illustrates an embodiment of a method, operation, 300 of a control circuit. In operation, as the temperature at a reference point changes, the resistance of a resistor component (e.g., resistor component 122, resistor component 124, thermistor 132, etc.) changes (Block 305). As the resistance of the resistor component changes, voltage of the control circuit will vary (Block 310). The voltage of the control circuit is compared to a predetermined voltage of a Zener type diode or a shunt regulator (Block 315). A determination is made whether the voltage of the control circuit has crossed the predetermined voltage (Block 320). If the voltage of the control circuit has crossed the predetermined voltage, the current is reduced, thus dimming the LEDs (Block 325), the method 300 then proceeds back to Block 305. If the voltage of the control circuit has not crossed the predetermined voltage, normal operating conditions are continued (Block 330), the method 300 then proceeds back to Block 305.

The temperature may be monitored at a plurality of references points and the current supplied to the light emitters reduced when the temperature at any of the reference points crosses a predetermined threshold value. The threshold values at each reference point need not be identical, and each threshold value may be designed to meet a requirement of a particular point of interest. For example, the temperature threshold for an LED driver 102 may be different from the temperature threshold for an LED engine 104.

In one embodiment, the thermal foldback device 100 is physically connected to a component of the light fixture, for example a driver case 146 and operatively connected to the light emitting devices through the LED driver 102, for example through a dimmer interface 110. In various embodiments, the thermal foldback device 100 is configured to operate with any 0-10V control. If the temperature threshold value, for example approximately 80° C., is exceeded, the thermal foldback device 100 causes the driver 102 to dim the light emitting devices, for example by reducing the supplied current, to reduce the brightness and heat output of the light emitting devices. If the temperature continues to rise, the current supplied to the light emitting devices is reduced further. The reduction in current may have a linear relation with the rise in temperature, or a curved or stepped relationship as desired. A second threshold value may also be established that turns off the light emitting devices completely.

Thus, the application provides, among other things, a {text}. Various features and advantages of the application are set forth in the following claims.

What is claimed is:

1. A thermal foldback control system comprising:

a temperature sensitive circuit configured to output a reference voltage corresponding to a temperature of at least one selected from a group consisting of a light emitting diode (LED) driver, a LED engine, and a LED;

wherein a driver output of the LED driver is based on the reference voltage; and wherein a connection between the temperature sensitive circuit and the at least one selected from the group consisting of the LED driver, the LED engine, and the LED is a mechanical and thermal connection.

2. The thermal foldback control circuit of claim 1, wherein the driver output powers one or more light emitting diodes (LEDs).

3. The thermal foldback control circuit of claim 1, wherein the reference voltage is based on a first resistance from a first resistance component and a second resistance from a second resistance component.

4. The thermal foldback control circuit of claim 3, wherein the first resistance component is at least one selected from a group consisting of a negative temperature coefficient (NTC) type thermistor and a positive temperature coefficient (PTC) type thermistor.

5. The thermal foldback control circuit of claim 3, wherein the second resistance component is at least one selected from a group consisting of a negative temperature coefficient (NTC) type thermistor and a positive temperature coefficient (PTC) type thermistor.

6. The thermal foldback control circuit of claim 1, further comprising a regulator.

7. The thermal foldback control circuit of claim 6, wherein the regulator is a shunt regulator.

8. The thermal foldback control circuit of claim 6, wherein the regulator includes at least one selected from a group consisting of a Zener diode, an avalanche breakdown diode, and a voltage regulator tube.

9. The thermal foldback control circuit of claim 6, wherein the regulator decreases a drive current in response to the reference voltage crossing a predetermined threshold.

10. The thermal foldback control circuit of claim 9, wherein the predetermined threshold is related to a predetermined temperature at a reference point.

11. The thermal foldback control circuit of claim 1, further comprising a capacitor in a parallel-type configuration with a second resistance component providing a second resistance.

12. A method of controlling power to one or more light emitting diodes (LEDs), the method comprising:

outputting, via a temperature-sensitive circuit, a reference voltage corresponding to a temperature of at least one selected from a group consisting of a light emitting diode (LED) driver, a LED engine, and a LED; and controlling one or more LEDs based on the reference voltage;

wherein a connection between the temperature sensitive circuit and the at least one selected from the group consisting of the LED driver, the LED engine, and the LED is a mechanical and thermal connection.

13. The method of claim 12, the LEDs are controlled via the LED driver.

14. The method of claim 12, wherein the reference voltage is based on a first resistance from a first resistance component and a second resistance from a second resistance component.

15. The method of claim 14, wherein the first resistance component is at least one selected from a group consisting of a negative temperature coefficient (NTC) type thermistor and a positive temperature coefficient (PTC) type thermistor.

16. The method of claim 14, wherein the second resistance component is at least one selected from a group consisting of a negative temperature coefficient (NTC) type thermistor and a positive temperature coefficient (PTC) type thermistor.

* * * * *